(12) United States Patent  
Röhm

(10) Patent No.: US 6,464,235 B2  
(45) Date of Patent: Oct. 15, 2002

(54) LATHE CHUCK WITH JAW LATCHES

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 130 days.

(21) Appl. No.: 09/745,225

(22) Filed: Dec. 21, 2000

(65) Prior Publication Data

US 2001/0015532 A1 Aug. 23, 2001

(30) Foreign Application Priority Data

Dec. 24, 1999 (DE) .......................................... 199 62 993

(51) Int. Cl.⁷ ............................................. B23B 31/167
(52) U.S. Cl. ..................... 279/123; 279/125; 279/121
(58) Field of Search ................................ 279/110, 121, 279/123, 125

(56) References Cited

U.S. PATENT DOCUMENTS

| | | | | |
|---|---|---|---|---|
| 3,656,773 A | * | 4/1972 | Blattry et al. ................. | 279/121 |
| 4,026,566 A | * | 5/1977 | Rohm .......................... | 279/121 |
| 4,200,300 A | * | 4/1980 | Rohm .......................... | 279/121 |
| 4,275,892 A | * | 6/1981 | Rohm .......................... | 279/121 |
| 4,725,065 A | * | 2/1988 | Hiestand ...................... | 279/123 |
| 5,630,594 A | * | 5/1997 | Bronzino et al. ............. | 279/123 |
| 5,716,058 A | | 2/1998 | Bronzino et al. | |
| 6,397,712 B1 | * | 6/2002 | Rohm ........................ | 279/110 |

FOREIGN PATENT DOCUMENTS

DE     195 09 976     8/1996

* cited by examiner

Primary Examiner—Steven C. Bishop  
(74) Attorney, Agent, or Firm—Herbert Dubno; Andrew Wilford

(57) ABSTRACT

A lathe chuck has a chuck body centered on and rotatable about a main axis and formed with a plurality of radially extending jaw-guide grooves and, transverse to the grooves, with respective guide passages each in turn formed with an abutment. Respective jaws displaceable in the grooves each have at least one tooth exposed in the respective guide passage and respective control rods displaceable along the passages each have at least one tooth meshing with the tooth of the respective jaw. A control pin is axially displaceable in each rod between an extended position projecting into the respective jaw-guide groove and a retracted position. The control pins are displaced on engagement with the teeth of the respective jaws into the retracted positions. A latch pin is axially displaceable in each rod between an extended latching position engaging the respective abutment and preventing movement of the respective rod in the respective passage and a retracted position permitting such movement. A spring urges the pins into their extended positions, and a coupling member engaged between the pins displaces the respective latch pin into the respective retracted position on displacement of the control pin into its retracted position. Thus, when there is no jaw in the guide groove, the latch pin of the respective control rod latches same against-movement in the respective passage.

9 Claims, 7 Drawing Sheets

LATHE CHUCK WITH JAW LATCHES

FIELD OF THE INVENTION

The present invention relates to a chuck. More particularly this invention concerns a multiple-jaw lathe chuck for rotating a workpiece during a machining operation.

BACKGROUND OF THE INVENTION

A standard lathe chuck has a chuck body centered on and rotatable about a main axis and formed with a plurality of radially extending jaw-guide grooves and, transverse to the grooves, with respective guide passages. Respective jaws radially. displaceable in the grooves each have an array of teeth exposed in the respective guide passage and respective control rods displaceable along the passages each also have an array of teeth meshing with the teeth of the respective jaw. These teeth are angled relative to the respective passages such that movement of the rods along the respective passages displaces the respective jaws radially in their guide grooves. Sides of the control rods are formed with angled grooves in which engage parts of an axially displaceable piston that is moved in one direction to shift the control rods in one direction and spread the jaws, and in the opposite direction to oppositely shift the control rods and bring the jaws together. Normally each control rod is associated with a respective adjuster that allows it to be moved so that a new jaw can be loaded into the respective slot.

A problem with such chucks is that, when holding a very large workpiece, the jaws are only engaged together by one tooth. Furthermore it is possible for the jaw to completely disengage and fly radially off, in particular if during a high-speed machining operation of such a large-diameter workpiece the engaged teeth on the jaw or rod shear off. Dring normal refitting of the chucks when the control piston that actually operates the rods is pulled back out of engagement with the control rods, these control rods can shake loose into positions where they interfere with installation of fresh jaws.

OBJECTS OF THE INVENTION

It is therefore an object of the present invention to provide an improved lathe chuck.

Another object is the provision of such an improved lathe chuck which overcomes the above-given disadvantages, that is which ensures that the control rods will not come loose or get in the way when new jaws are being fitted.

SUMMARY OF THE INVENTION

A lathe chuck has according to the invention a chuck body centered on and rotatable about a main axis and formed with a plurality of radially extending jaw-guide grooves and, transverse to the grooves, with respective guide passages each in turn formed with an abutment. Respective jaws displaceable in the grooves each have at least one tooth exposed in the respective guide passage and respective control rods displaceable along the passages each have at least one tooth meshing with the tooth of the respective jaw. The teeth are angled relative to the respective passages such that movement of the rods along the respective passages displaces the respective jaws radially in their guide grooves. In accordance with the invention a control pin is axially displaceable in each rod between an extended position projecting into the respective jaw-guide groove and a retracted position. The control pins are displaced on engagement with the teeth of the respective jaws. into the retracted positions. A latch pin is axially displaceable in each rod between an extended latching position engaging the respective abutment and preventing movement of the respective rod in the respective passage and a retracted position permitting such movement. A spring urges the pins into their extended positions, and a coupling member engaged between the pins displaces the respective latch pin into the respective retracted position on displacement of the control pin into its retracted position. Thus, when there is no jaw in the guide groove, the latch pin of the respective control rod latches same against movement in the respective passage.

With this system, therefore, if a jaw is not properly fitted to a guide groove, the respective control rod will remain locked in an end position, precluding use of the chuck until the missing or misfitted jaw is attended to. A jaw can only be inserted into its guide groove when the respective control rod is fully retracted out of the way; otherwise the control rod will block the guide groove and prohibit sliding-in a jaw and will simultaneously block actuation of the jaw-tightening chuck piston.

According to the invention each rod has an end position with the respective tooth outside the respective jaw-guide groove and unengageable with a jaw therein. The chuck further has a respective resetting element in each rod and engageable with the chuck body and with the respective latch pin in the end position of the respective rod for holding the respective latch pin in the respective retracted position. Thus the control rods are only latched in place when they are not in their end positions or their control rods are not in engagement with the respective jaw. If a jaw has been improperly loaded so that its teeth are not caught on the teeth of the respective control rod, it will be necessary to back off the control rod and reset the jaw before the chuck can be tightened. To this end the rods are each closely juxtaposed with an end of the respective passage in the end position and each rod is formed with an element guide slidably receiving the respective resetting element and open axially toward the end of the respective passage.

The chuck further has according to the invention respective springs urging the resetting elements into a position out of engagement with the respective latch pins and projecting axially from the respective control rods toward the end of the respective passage. The resetting elements are engageable with the ends of the respective passages and pressable thereby into engagement with the respective latch pins to displace same into the respective retracted positions.

Each resetting rod has a flat face lying flatly against and slidable on a respective flat race of the respective passage. In addition each resetting rod and the respective latch pin have respective angled camming faces engageable with each other.

Each control member in accordance with the invention is a two-arm lever pivoted in the respective rod and having one end engaging the respective control pin and an opposite end engaging the respective latch pin. Alternately, the control and latch pins have confronting toothed edges and the control members are gear wheels rotatably mounted in the respective rods and meshing with the toothed edges of the respective pins. In either case each control rod is provided with an axle on which the respective control member is rotatable.

Furthermore according to the invention each rod is formed with an actuating groove having an end portion extending parallel to the respective passage and a main portion extending at an angle to the respective passage. The chuck further has according to the invention an actuating element having respective parts engaged in the actuating grooves. The element is axially displaceable to shift the rods in the respective passages when the parts are engaged in the main portions but is axially locked when any of the parts is in the respective end portion.

Normally the actuating element is a piston that is shifted axially to move all the jaws simultaneously. An end-position switch prevents the drive that rotates the chuck about its axis from starting unless the piston is moved out of an end position indicating that the jaws have been tightened on the workpiece. With the system of this invention this piston will hang up in the end portions of the grooves, making it impossible for the piston to retract and for the drive to start. It becomes necessary for the machine operator to determine which jaw is not properly set and fix it before the machine can be restarted.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
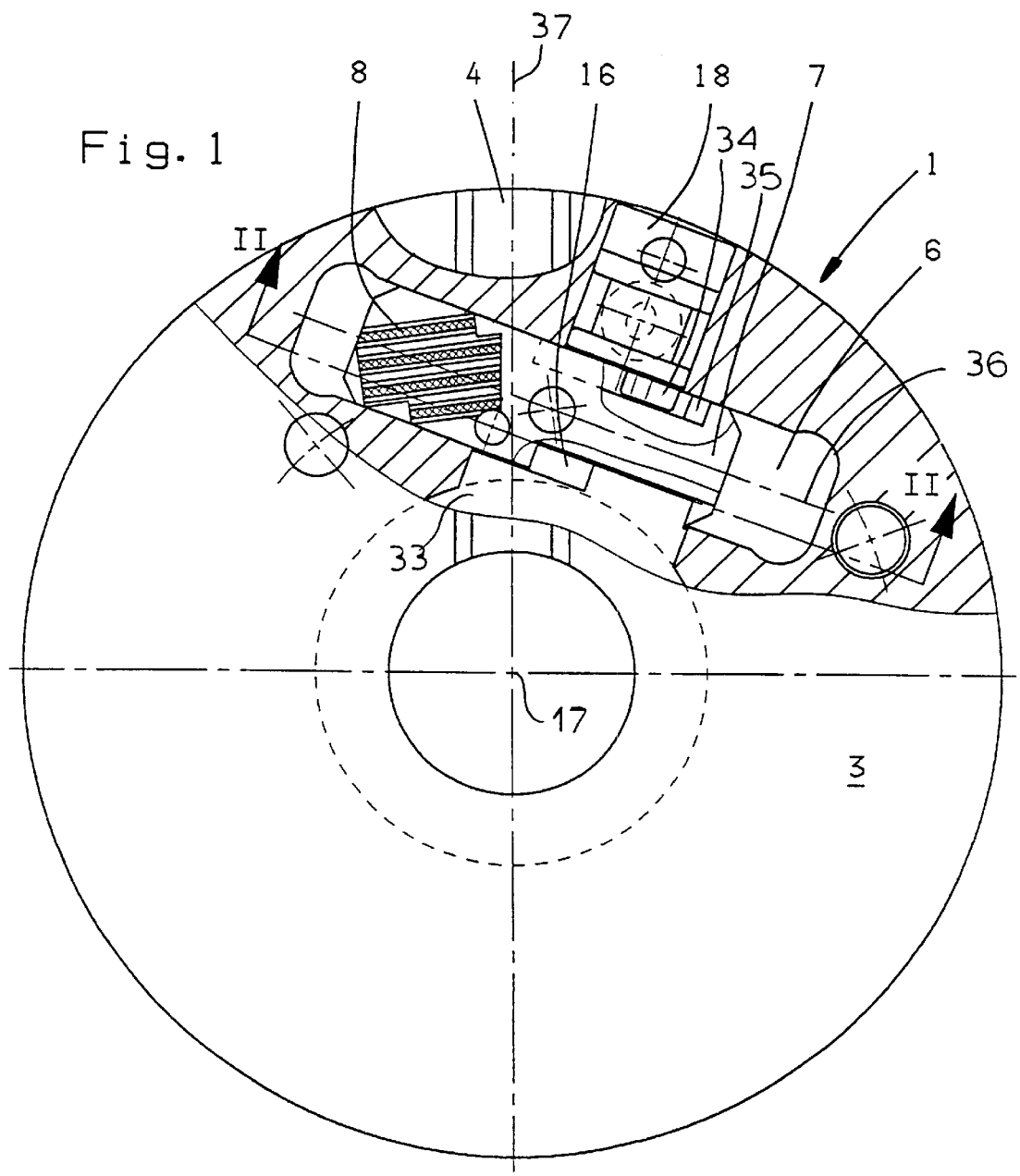
FIG. 1 is an axial end view partly in section of the chuck according to the invention.

As seen in FIGS. 1 through 5 a chuck 1 according to the invention has a circular base plate 2 and body 3 centered on an axis 17 and both formed of machined metal castings. The body 3 is formed with three radially extending guide grooves 4 each receiving a respective jaw 5 and extending along a respective axis 37. Each guide groove 4 is crossed by a respective guide passage 6 centered on an axis 36 lying in a plane perpendicular to the axis 17 and forming an angle of about 75° to the axis 37 of the respective guide groove 4.

Each passage 6 in turn holds a respective control rod or block 7 that can move along the respective axis 36 and that is formed with angled teeth 8 meshing with angled teeth 9 on the back face of the respective jaw 5.

A side face of each control rod 7 is formed with a groove 19 having an end portion 20 extending parallel to the respective axis 36 and a main portion 16 extending therefrom and at an acute angle to a plane including the axis 17. A piston 33 has a respective parallelogrammatic part 15 engaged in each of the grooves 19. As is standard, displacement of the piston 33 parallel to the axis 17 with the part 15 engaged in the main portion 16 of the groove 19 will displace the respective control rod 7 along the axis 36 in one direction or the other. In addition according to the invention if the rod 7 is in the end position of FIG. 2 or very close to it as shown in FIG. 3, the part 15 is engaged in the portion 20 and the piston 33 cannot retract, that is to move the parts 15 down as shown in FIGS. 2 through 5.

Figure 14:
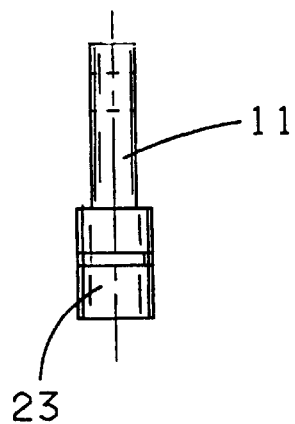
FIG. 14 is a side view of the latch pin in the direction of arrow XIV of FIG. 13.

Each control rod 7 is provided with a control pin 10 that can project parallel to the axis 17 from its front or outer (up in FIGS. 2 through 5) face and a latch pin 11 (also shown in FIGS. 3 and 14) that can project oppositely from the back face of the rod 7. Each pin 10 and 11 is displaceable between an extended position projecting from the respective face of the rod 7 to a retracted position flush with or recessed relative to the respective rod face. A coupling element 12 formed as a rocker is mounted on an axle 27 threaded into a bore 28 of the rod 7 and has one end seated in a notch 38 in the pin 10 and an opposite. end in a notch 29 of the pin 11 so that they will move axially oppositely. A spring 13 braced between the rod 7 and a head of the pin 11 urges the two pins 10 and 11 into their extended positions. This spring 13 could also bear on the other pin 10 or on the rocker 12 for the same effect. The outer end of the pin 11 can engage in an abutment pocket 14 formed in the back wall of the respective passage 6 to prevent sliding of the respective control rod 7.

Figure 18:
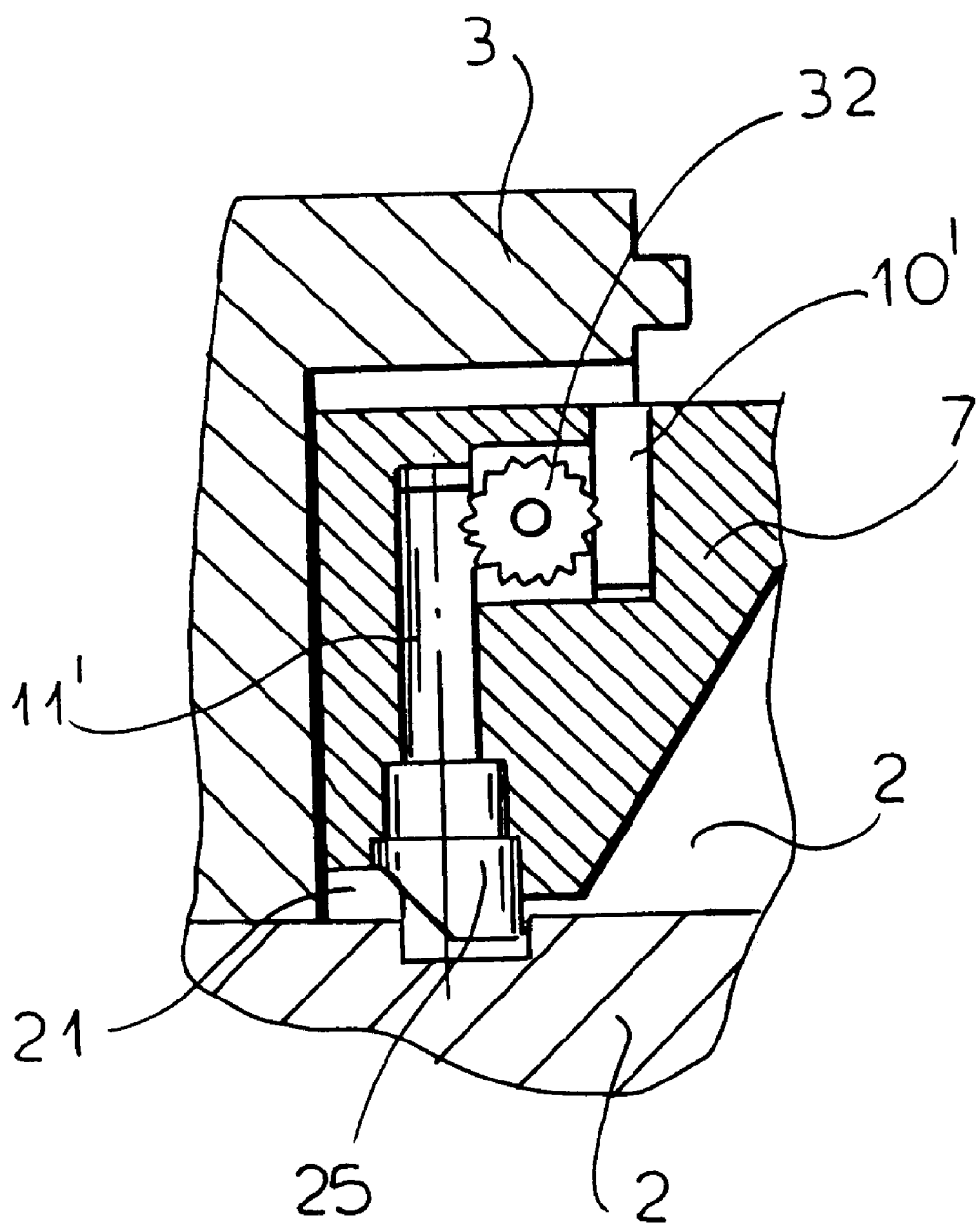
FIG. 18 is a view corresponding to a detail of FIG. 2 but showing an alternative form of this invention.

Alternately as shown in FIG. 18 the rocker 12 can be replaced with a gear wheel 32 that meshes on one side with rack teeth formed in a pin 10' and on the other side with similar rack teeth formed in a pin 11'. As with the rocker 12, the gear 32 ensures perfectly opposite synchronous movement of the pins 10' and 11'.

Each control rod 7 is associated with a respective adjuster 18 having an eccentric pin 34 engaged in a transverse groove 35 in the side of the rod 7. Rotation of this adjuster 18 by an appropriate tool, normally an Allen wrench, can displace the rod 7 between the position of FIG. 4, which is the most retraction possible with the piston 33 alone, to the position of FIG. 2.

Figure 15:
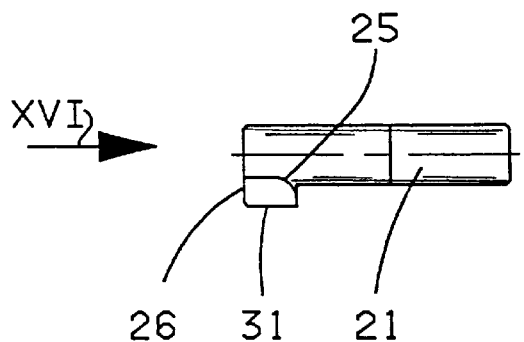
FIG. 15 is:a side view of the resetting rod.
Figure 16:
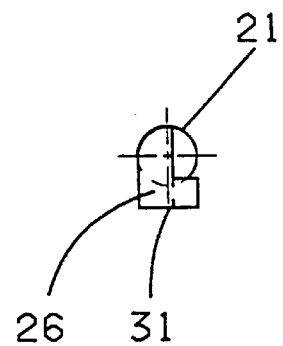
FIG. 16 is an end view of the resetting rod in the direction of arrow XVI of FIG. 15.
Figure 17:
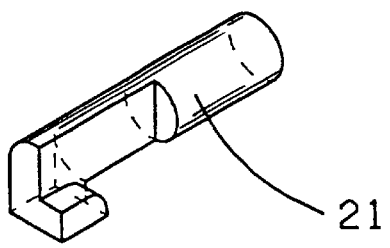
FIG. 17 is a perspective view of the resetting rod.

A resetting pin 21 shown in some detail in FIGS. 15 through 17 is generally cylindrical and received in a bore 22 formed in each rod 7 and extending parallel to the respective axis 36. The pin 21 has a flat end 26 adapted to engage the end face of the passage 6 and a flat lower face 31 adapted to ride on the floor of the passage 6, s0 as to keep it from turning in the bore 22. In addition this pin 21 has a cam edge 25 adapted to engage a similarly angled cam face 23 of the pin 11. A spring 24 urges the pin 21 outward so that its end face 26 projects from the end of the respective rod 7.

Figure 2:
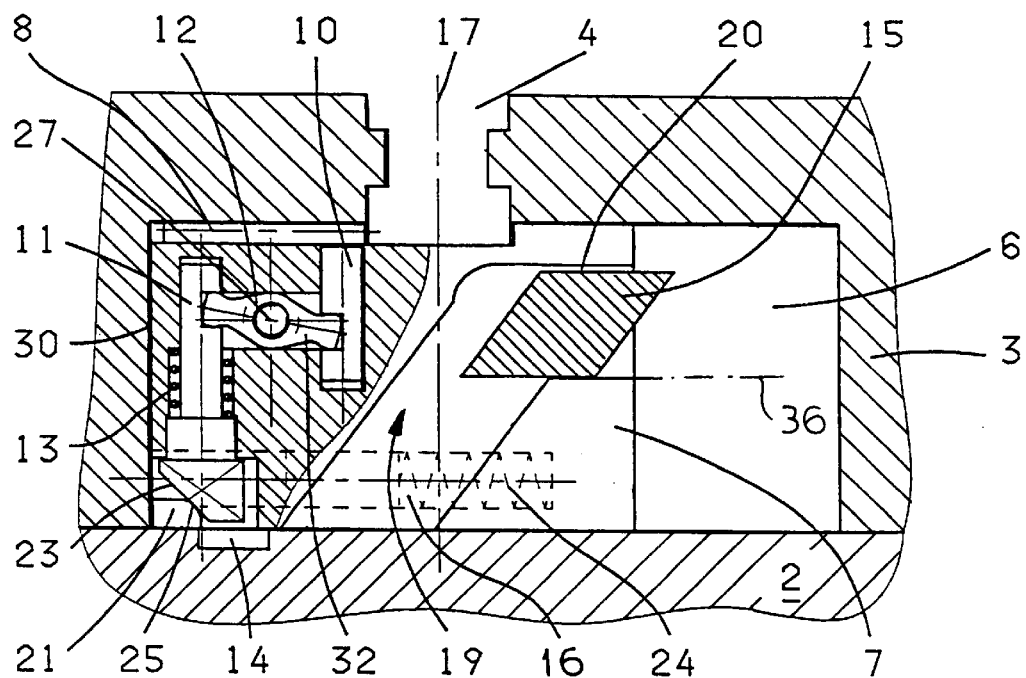
FIG. 2 is a section taken along line II—II of FIG. 1, with the control rod shown in an end position suitable for changing a jaw.
Figure 3:
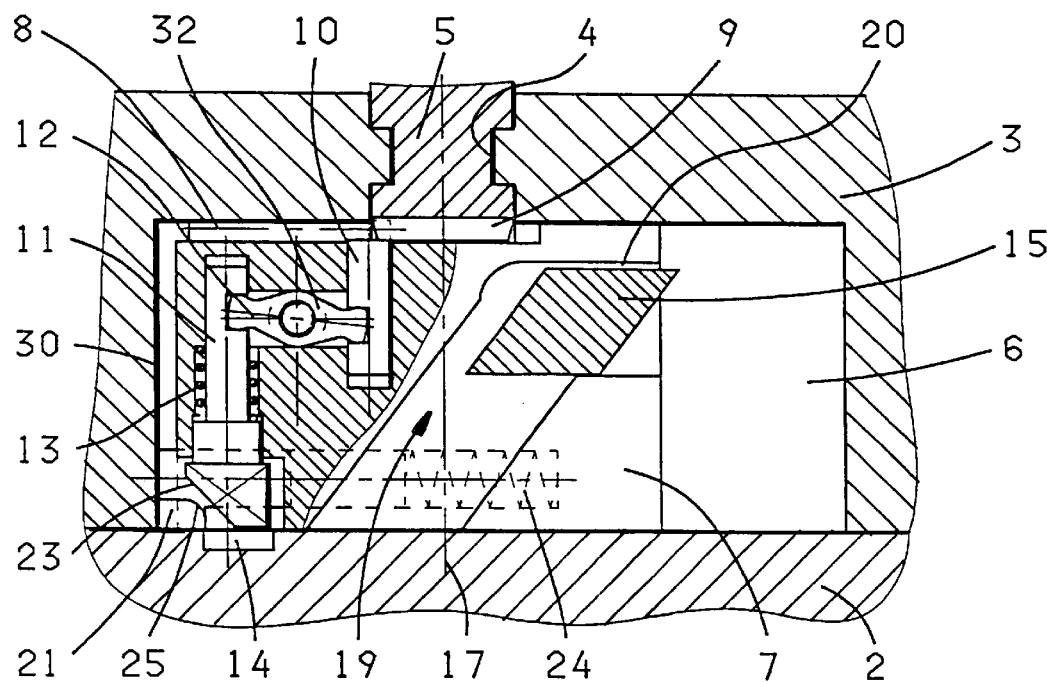
FIG. 3 is a view like FIG. 2 but with the control-rod teeth slightly engaged in the jaw teeth.

The purpose of the resetting pin is to make it impossible to insert a jaw 5 into a guide groove 4 unless the respective control block 7 is retracted fully to its end position shown in FIG. 2 in which its teeth 8 are wholly out of the guide groove 4. In this position the end portion 20 of the groove 19 also blocks movement of the jaw-displacing piston 33.

More particularly it is clear that in the end position of FIG. 2 the head end 26 of the pin 21 butts against the end wall of the passage 6 so that this pin 21 is pushed back against the force of its spring 24 into the rod 7 and its edge 25 engages the cam face 25 of the rod 11, pushing it up into the retracted position not engageable in the pocket 14. In this position the respective guide groove 4 is completely clear so that a jaw 5 can be fitted to it.

Figure 4:
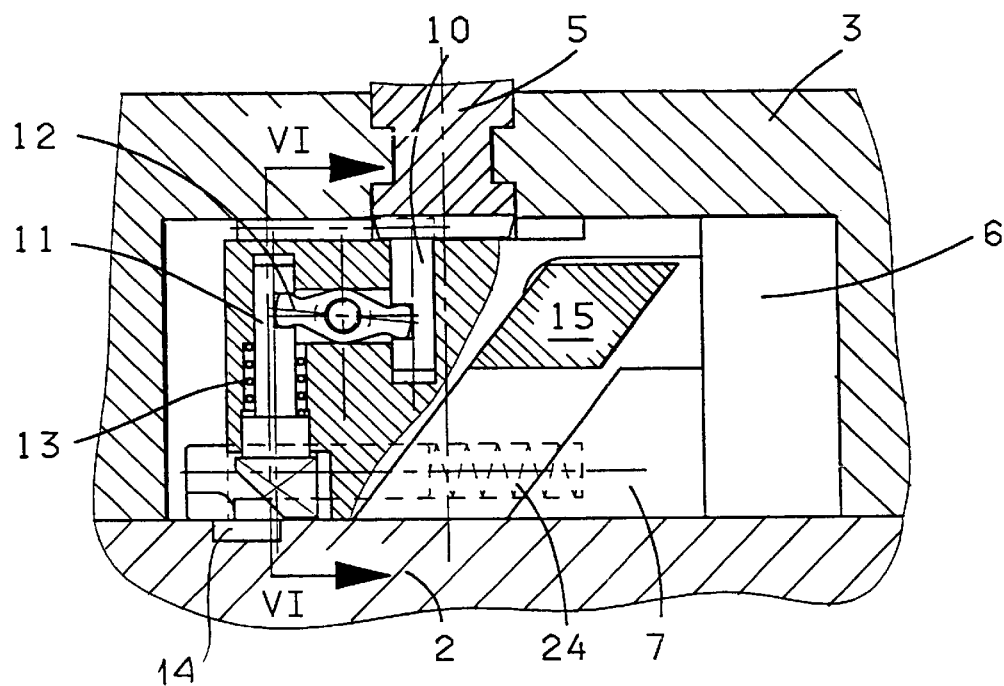
FIG. 4 is a view like FIG. 2 but with the control-rod teeth well engaged in the jaw teeth.

As shown in FIG. 3 when a jaw 5 is fitted to the groove 4 and the respective adjuster 18 is operated to advance the rod 7, the pin 11 will engage the teeth 9 and will remain in its retracted position, holding the pin 10 in the retracted position in spite of the fact that the pin 21 has pushed out and disengaged its cam surface 25 from the respective can surface 23. is Further advance of the rod 7 as shown in FIG. 4 takes place without the pin 11 catching in the abutment pocket 14.

Figure 5:
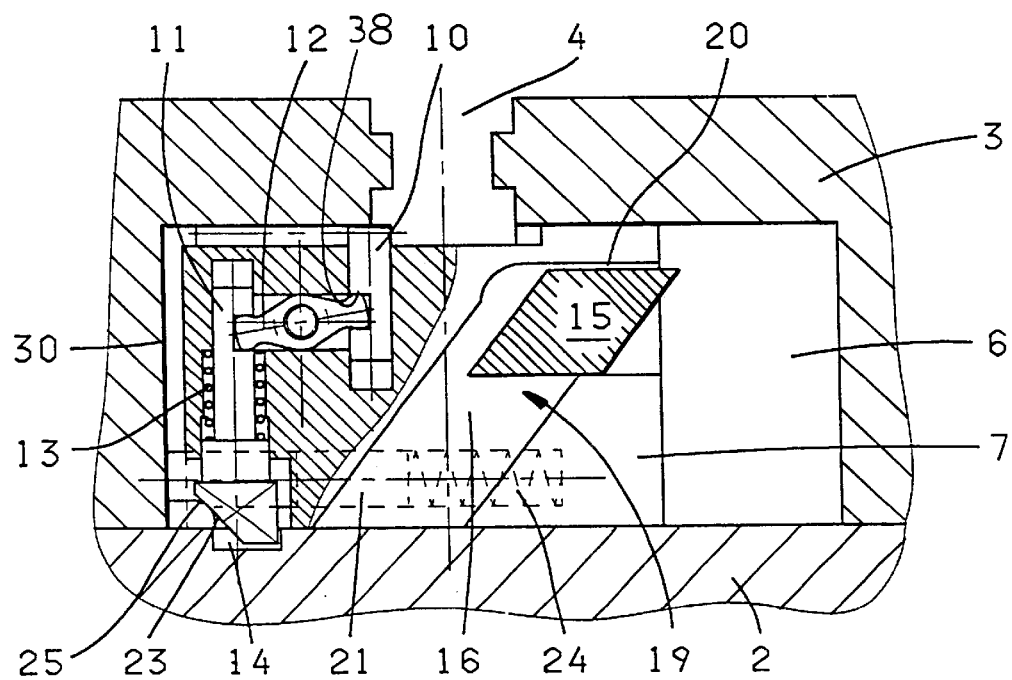
FIG. 5 is a view like FIG. 2 and in the same position as in FIG. 2, but with no jaw in place.
Figure 6:
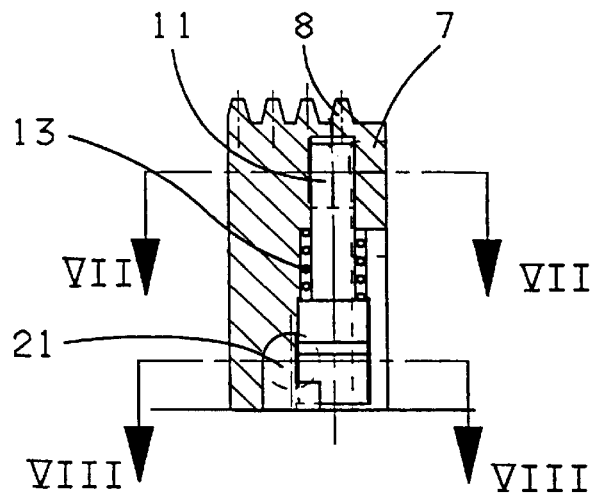
FIG. 6 is a section through the along line VI—VI of FIG. 4.
Figure 7:
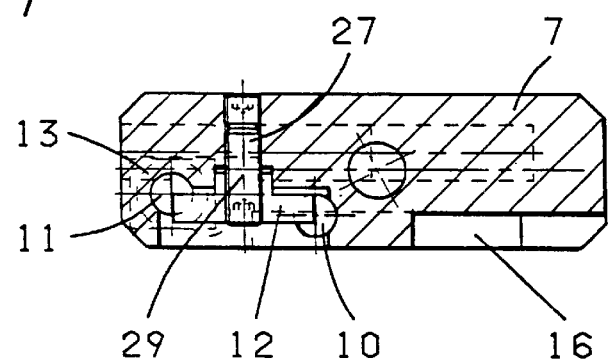
FIGS. 7 and 8 are sections taken along respective lines VII—VII and VIII—VIII of FIG. 6.
Figure 8:
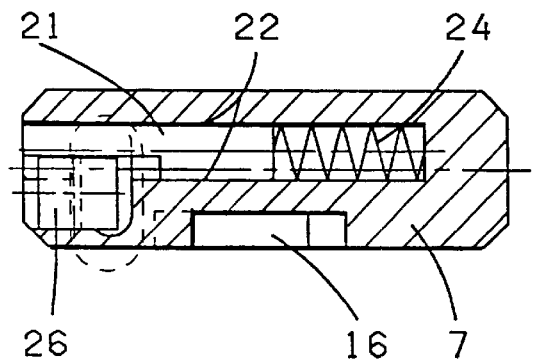
Figure 9:
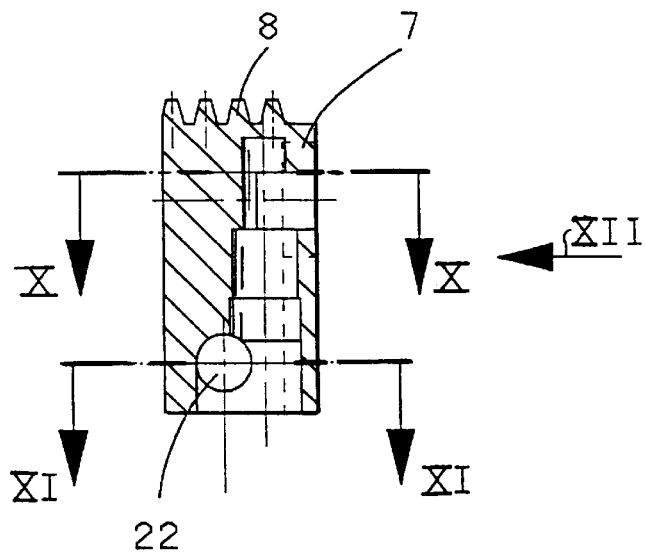
FIG. 9 is a section like FIG. 6 but only showing the jaw.
Figure 10:
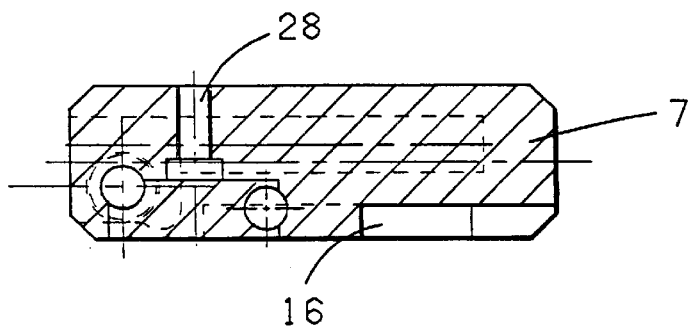
FIGS. 10 and 11 are sections taken along respective lines X—X and XI—XI of FIG. 9.
Figure 11:
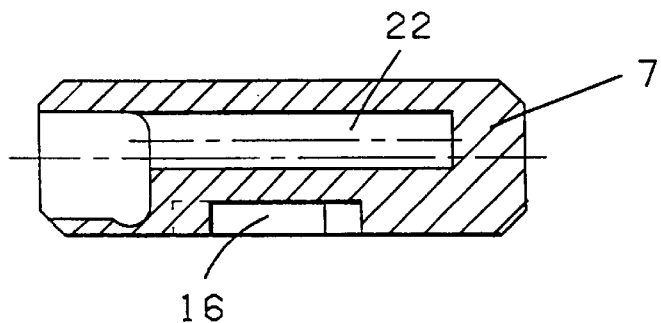
Figure 12:
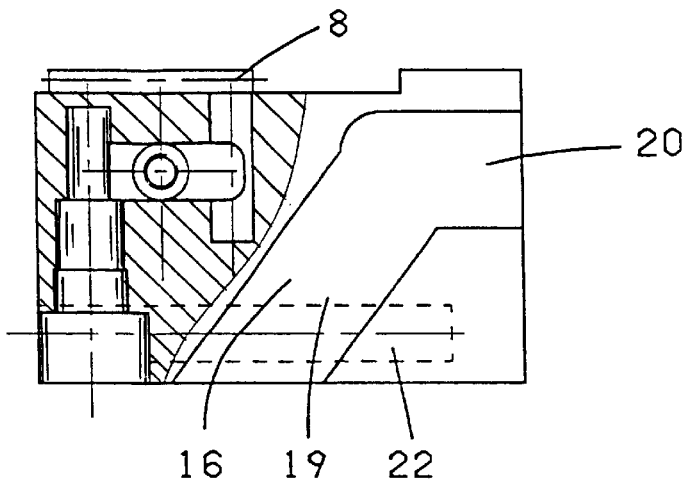
FIG. 12 is a side view taken in the direction of arrow XII of FIG. 9.
Figure 13:
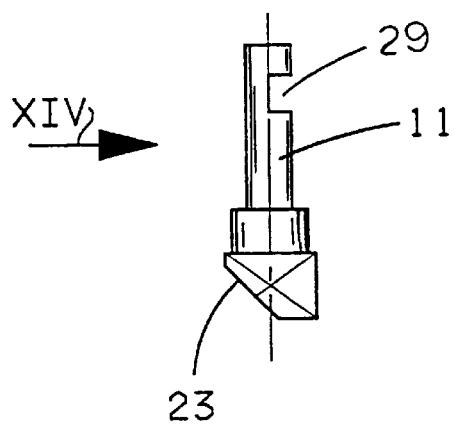
FIG. 13 is a side view showing the latch pin.

If, however, there is as shown in FIG. 5 no jaw 5 present when the rod 7 is advanced, the pin 10 will pop out and, when the surfaces 23 and 25 disengage the pin 11 will extend to catch in the abutment pocket 14 and prevent further advance of the rod 7. Furthermore the extended pin 10 will block insertion of a jaw 5 into the slot 4. In order to fit a jaw 5 to the slot 4 it will be necessary to use the adjuster 18 to retract the rod The piston parts 15 are engaged in the blocking end portions 20 of the grooves 19 until the respective rods. 7 are moved into the FIG. 4 position in which there is sufficient interengagement of the teeth 8 and 9 to solidly hold the jaws 5. Thus it is not possible to actually close the chuck and clamp a workpiece in an unsafe manner.

I claim:

1. A lathe chuck comprising:
   a chuck body centered on and rotatable about a main axis and formed with a plurality of radially extending jaw-guide grooves and, transverse to the grooves, with respective guide passages each in turn formed with an abutment;
   respective jaws radially displaceable in the grooves and each having at least one tooth exposed in the respective guide passage;
   respective control rods displaceable along the passages and each having at least one tooth meshing with the tooth of the respective jaw, the teeth being angled relative to the respective passages such that movement of the rods along the respective passages displaces the respective jaws radially in their guide grooves;
   a control pin axially displaceable in each rod between an extended position projecting into the respective jaw-guide groove and a retracted position, the control pins being displaced on engagement with the teeth of the respective jaws into the retracted positions;
   a latch pin axially displaceable in each rod between an extended latching position engaging the respective abutment and preventing movement of the respective rod in the respective passage and a retracted position permitting such movement;
   means including a spring for urging the pins into their extended positions; and
   means including a coupling member engaged between the pins for displacing the latch pin into the respective retracted position on displacement of the control pin into its retracted position, whereby when there is no jaw in the guide groove, the latch pin of the respective control rod locks same against movement in the respective passage.

2. The lathe chuck defined in claim 1 wherein each rod has an end position with the respective tooth outside the respective jaw-guide groove and unengageable with a jaw therein, the chuck further comprising:
   means including a respective resetting element in each rod and engageable with the chuck body and with the respective latch pin in the end position of the respective rod for holding the respective latch pin in the respective retracted position.

3. The lathe chuck defined in claim 2 wherein the rods are each closely juxtaposed with an end of the respective passage in the end position, each rod further being formed with an element guide slidably receiving the respective resetting element and open axially toward the end of the respective passage, the chuck further comprising:
   respective springs urging the resetting elements into a position out of engagement with the respective latch pins and projecting axially from the respective control rods toward the end of the respective passage, the resetting elements being engageable with the ends of the respective passages and presumable thereby into engagement with the respective latch pins to displace same into the respective retracted positions.

4. The lathe chuck defined in claim 3 wherein each resetting rod has a flat face lying flatly against and slidable on a respective flat race of the respective passage.

5. The lathe chuck defined in claim 3 wherein each resetting rod and the respective latch pin have respective angled calming faces engageable with each other.

6. The lathe chuck defined in claim 1 wherein each control member is a two-arm lever pivoted in-the respective rod and having one end engaging the respective control pin and an opposite end engaging the respective latch pin.

7. The lathe chuck defined in claim 1 wherein the control and latch pins have confronting toothed edges and the control members are gear wheels rotatably mounted in the respective rods and meshing with the toothed edges of the respective pins.

8. The lathe chuck defined in claim 1 wherein each control rod is provided with an axle on which the respective control member is rotatable.

9. The lathe chuck defined in claim 1 wherein each rod is formed with an actuating groove having an end portion extending parallel to the respective passage and a main portion extending at an angle to the respective passage, the chuck further comprising
   an actuating element having respective parts engaged in the actuating grooves, the element being axially displaceable to shift the rods in the respective passages when the parts are engaged in the main portions but being axially locked when any of the parts is in the respective end portion.

* * * * *